United States Patent [19]

Yamamoto et al.

[11] Patent Number: 4,919,809

[45] Date of Patent: Apr. 24, 1990

[54] HOLLOW FIBER MEMBRANE

[75] Inventors: Takuya Yamamoto; Fumiyoshi Fushimi; Jyoji Nishikido, all of Nobeoka, Japan

[73] Assignee: Asahi Kasei Kogyo Kabushiki Kaisha, Osaka, Japan

[21] Appl. No.: 381,253

[22] Filed: Jul. 18, 1989

[30] Foreign Application Priority Data

| Jul. 20, 1988 | [JP] | Japan | 63-179153 |
| Oct. 14, 1988 | [JP] | Japan | 63-257080 |
| Mar. 17, 1989 | [JP] | Japan | 61-63880 |
| Jun. 6, 1989 | [JP] | Japan | 142222 |
| Jun. 9, 1989 | [JP] | Japan | 145145 |
| Jun. 13, 1989 | [JP] | Japan | 148306 |

[51] Int. Cl.$^5$ ............................................. H01D 13/01
[52] U.S. Cl. ............................ 210/500.23; 210/500.29
[58] Field of Search ................. 210/321.64, 321.79, 210/321.8, 321.87, 321.88, 321.89, 500.23, 500.28, 500.29, 500.3, 500.31, 500.32

[56] References Cited

U.S. PATENT DOCUMENTS

| 4,219,426 | 8/1980 | Spekle et al. | 210/500.23 |
| 4,604,326 | 8/1986 | Manabe et al. | 210/500.23 |
| 4,787,977 | 11/1988 | Nakano et al. | 210/500.23 |
| 4,822,540 | 4/1989 | Manabe et al. | 210/500.23 |

Primary Examiner—Frank Sever
Attorney, Agent, or Firm—Finnegan, Henderson, Farabow, Garrett & Dunner

[57] ABSTRACT

Disclosed is a regenerated cellulose hollow fiber membrane having a hollow portion continuously penetrating in the direction of the fiber axis, a wet porosity of 60 to 95%, and an albumin sieving coefficient not larger than 0.15 at hemofiltration. The hollow fiber membrane preferably has an average pore radius in the wet state of 40 to 250 angstroms, and the mass transfer coefficient for $\beta_2$-microglobulin of at least $2 \times 10^{-5}$ cm/sec. The hollow fiber membrane preferably contains polyethylene glycol and has the albumin sieving coefficient not larger than 0.10. The hollow fiber membrane is especially useful for hemofiltration therapy such as hemodialysis.

6 Claims, 2 Drawing Sheets

HOLLOW FIBER MEMBRANE

BACKGROUND OF THE INVENTION

1. Field of the Invention

The present invention relates to a separating membrane having an excellent molecular size selectivity and able to remove uremic toxins in blood, which have a molecular size smaller than that of albumin, at a high efficiency while controlling the loss of not only albumin but also valuable blood proteins, which have a molecular size larger that of albumin.

More particularly, the present invention relates to an improved regenerated cellulose hollow fiber membrane for hemopurification of blood whereby, when used for a hemopurification therapy, especially hemodialysis, a variety of high-molecular-weight uremic toxins having a molecular weight of 5,000 to 66,000, represented by $\beta_2$-microglobulin, causing hemodialysis amyloidosis, which is a complication occurring in patients suffering from a chronic renal failure or the like, can be selectively removed without loss of valuable substances having a higher molecular weight, such as albumin, in blood.

2. Description of the Related Art

In patients suffering from chronic renal failure or the like and receiving a hemopurification therapy, complications such as anemia, hypertension, pigmentation, and bone and joint troubles, are often observed, and a clarification of the causes of and research into measures against these complications are under way.

Various causes of the above complications, for example, increasing severity of the original disease, hemeostasis-maintaining reaction premised on the presence of the original disease, reaction to pharmacotherapy and an insufficient hemopurification therapy, can be considered as an exogenous cause, in general, the substance-removing capacity of a hemopurification module used in the hemopurification therapy, especially a separating membrane, can be mentioned. Namely, it is considered that uremic toxins that cannot be removed by a conventional hemopurification membrane or can be removed only in amounts much smaller than the amounts produced in the living body, accumulate and cause complications. Nevertheless, there is no example of a complication in which the generating mechanism including the identification of a disease-causing substance is fully clarified. Accordingly, a membrane capable of removing urea having a molecular weight of 60 and uremic toxins having a molecular weight of up to about 5,000, at a high efficiency, has been widely sought.

In 1985, it was first proved that, of various complications, a main cause of hemodialysis amyloidsis represented by carpal tunnel syndrome is an accumulation of $\beta_2$-microglobulin having a molecular weight of 11,800 [F. Gejyo et al., Biochem. Biophys. Res. Commun., 129, 701–706 (1985)]. Because of the history of hemopurification membranes before this finding, and because of an excellent capacity for removing low-molecular-weight uremic toxins such as urea and creatinine, hemopurification modules using regenerated cellulose hollow fiber membranes were widely used. These membranes, however, have an average membrane pore radius of as small as 30 angstroms or less, and thus $\beta_2$-microglobulin substantially cannot be removed by these membranes. Based on the concept that the hemodialysis amyloidosis is caused by an accumulation of $\beta_2$-microglobulin, which is due to the above-mentioned insufficient hemopurification therapy, the development of a hemopurification membrane capable of removing $\beta_2$-microglobulin at a high efficiency was required. At the same time, the concept of examining the curative effect while removing all substances in blood having a molecular weight lower than the molecular weight (66,000) of albumin, having a relatively low molecular weight among valuable blood proteins, has rapidly spread. Namely the molecular size range of uremic toxins to be removed has expanded to the higher molecular weight side.

In view of the above, it is obvious that the conventional hemopurification membranes having an average pore radius not larger than 30 angstroms cannot satisfy this performance requirement: a membrane having a large membrane pore radius must be used for the removal of large substances.

As the large-pore-radius hollow fiber membrane composed of regenerated cellulose, a membrane used for the separation of a virus is known (see, for example, Japanese Unexamined Patent Publications No. 58-89626, No. 58-89628, No. 59-204911 and No. 61-254202). This membrane is used for preparing a virus-free plasma as a fractionated plasma derivative from blood pooled outside the living body, and therefore the membrane has a large membrane pore radius, a membrane structure, and a hemofiltration characteristic such that valuable substances in blood, a permeation of which is not desirable through a hemopurification membrane for the therapy of chronic renal failure, such as albumin and globulin, are allowed to permeate through the membrane. Namely, a regenerated cellulose hollow fiber membrane having a pore radius between the pore radius of the above-mentioned large-pore-radius membrane and that of the conventional hemopurification membrane, and having a membrane structure and hemodialysis and hemofiltration characteristics by which the object of the present invention can be obtained, was not known.

Among synthetic polymeric membranes, there is known a protein-leaking membrane which allows a permeation of albumin, which is a valuable blood protein, resulting in a loss of the albumin.

In contrast, mainly in the field of synthetic polymeric membrane materials, an adsorption removal-depending type hollow fiber membrane to be used exclusively for the removal of $\beta_2$-microglobulin (see, for example, Japanese Unexamined Patent Publication No. 63-109871), and a hollow fiber membrane in which a monomolecular adsorption layer of a protein is formed on the inner surface of the hollow fiber membrane to strictly control the molecular weight-fractionating characteristic participating in filtration [Hiroshi Ohno et al., Membrane, 13 (5), 248 (1988)], have been developed.

In the conventional hollow fiber membranes, in general, regardless of the membrane material, a water-soluble substance is contained to maintain a substance permeability, and in general, glycerol is practically used for this purpose.

As the main mechanisms of the removal of uremic toxins, there can be mentioned (1) diffusion removal, (2) filtration removal, and (3) adsorption removal. Various therapeutic methods corresponding to these mechanisms have been proposed and worked, but the hemodialysis therapy depending on diffusion is currently most widely used because there are few limitations on the equipment and maintenance thereof, the fluid therapy is unnecessary, and the treatment cost is low. Nevertheless, in the above conventional membranes for the removal of high-molecular-weight uremic toxins, the removal of substances depends mainly on the filtration or adsorption mechanism, and therefore, too much technical importance is attached to the control of the sieving coefficient indicating the filtration removal capacity, and the adsorption rate and equilibrium adsorption quantity indicating the adsorption removal capacity. Thus, in hemodialysis therapy, which is the most popular hemopurification therapy, the removal by the diffusion mechanism, which is most suitable, is very difficult for these membranes. This is due to the current technical consideration that, according to the "Stokes-Einstein equation" concerning diffusion, the diffusion coefficient is small in a high-molecular-weight substance, and therefore, it is not practical to rely on the diffusion mechanism for the removal of high-molecular-weight uremic toxins.

In general-purpose hemodialysis therapy, only about 2 to about 5 l of water is removed by one treatment, although the amount of water removed differs according to the state of a renal failure patient. Therefore, even if the sieving coefficient for high-molecular-weight uremic toxins is improved, according to "the filtration mechanism" premised on the removal of water in as large an amount as 10 to 30 l, a sufficient removal of high-molecular-weight uremic toxins cannot be obtained. Namely, the conventional technique in which control of the sieving coefficient is intended is currently as a therapeutically non-general technique premised on hemofiltration therapy or hemofiltration therapy.

Even based on this non-general hemofiltration therapy or hemodiafiltration therapy as the premise, in a conventional protein-leaking membrane formed of a synthetic polymeric material, it is considered that the average membrane pore radius is increased in the absence of a sufficient examination of the hemodialysis and filtration characteristics of the membrane. Accordingly, the sieving coefficient for albumin, which is a valuable component in blood, is large and albumin is literally lost, with the result that exhaustion occurs after the hemodialysis and hypoproteinemia is often induced. Therefore, this membrane has not been used except for special clinical cases where very much advantageous results are desired despite the known defects.

It is considered that, in practice, there is no problem if the loss of albumin is less than 10 g, preferably less than 5 g, in one treatment. Accordingly in a hemodialyser used for most popular hemopurification therapy, the loss of valuable protein components is not considered significant if the sieving coefficient of the used hollow fiber membrane to albumin is not larger than 0.15. Nevertheless, a smaller screening coefficient is preferable, and the screening coefficient should be not larger than 0.10, more preferably not larger than 0.05, which requires no special care during hemodialysis. This control of the loss of albumin in the hemodialysis, however, gives rise to another problem: namely, the removal capacity for substances which must be removed, such as $\beta_2$-microglobulin, is lowered.

In the membrane based on the adsorption removal mechanism, much importance is attached to the selective adsorption of $\beta_2$-microglobulin, and therefore, the membrane is not suitable for removing other high-molecular-weight uremic toxins, and thus can be used for hemopurification only in a very limited region. Moreover, since the adsorption is irreversible, a deterioration of the hollow fiber membrane with the lapse of time cannot be avoided during use, and a removal exceeding the saturation adsorption quantity cannot be effected. Accordingly, to remove clinically sufficient amounts of substances, a considerable amount of the hollow fiber membrane is necessary, and thus the amount of blood circulated outside the body must be increased, and thus it is difficult to use this membrane in practice. Further, this membrane is not adapted to the re-use of a hemopurification module, as practiced in some countries.

Furthermore, the conventional membrane for removing high-molecular-weight uremic toxins is inferior to the conventional hemopurification membrane in the effect of removing low-molecular-weight uremic toxins such as urea and creatinine, although this defect is associated with the therapeutic method.

In the diffusion removal of substances, the membrane surface aperture ratio indicating the area ratio of void portions in the substance-permeating surface of the membrane is an important criterion, and the larger this membrane surface aperture ratio, the larger the diffusion removal capacity, assuming that the other membrane structures are the same. For simplification, the wet porosity indicating the volume ratio of void portions in the membrane can be used instead of the membrane surface aperture ratio, and it is considered that the wet porosity should be similarly increased so as to increase the diffusion removal capacity. In Japanese Unexamined Patent Publication No. 63-109871, it is stated that, to maintain a practical strength of the hollow fiber membrane, the total volume porosity corresponding substantially to the wet porosity referred to in this specification should be not larger than 75%, although the particulars thereof are not known because data of the various materials exemplified is not give in the examples.

This value, however, is not satisfactory when designing a membrane depending on the diffusion removal mechanism. Furthermore, since the diffusion removal capacity is further increased by reducing the thickness of the hollow fiber membrane, a practical strength must be maintained at a reduced membrane thickness.

SUMMARY OF THE INVENTION

In view of the foregoing, the primary object of the present invention is to provide a regenerated cellulose hollow fiber membrane which is useful as a hemopurification membrane, especially a membrane for hemodialysis, has a high practical strength, and in which, in connection with the sieving coefficient participating in the filtration removal, the molecular size selectivity (molecular weight-fractionating characteristic) is so strict that the value abruptly changes with the molecular weight of albumin as the boundary, the mechanism of the diffusion removal can be used for a variety of substances ranging from low-molecular-weight substances to high-molecular-weight substances, and the material and structure factors such as the wet porosity and average membrane pore radius are such that a deterioration with a lapse of time due to an adsorption or trapping of proteins and the like is controlled to a low level such that it can be ignored.

The above-mentioned object can be achieved by a regenerated cellulose hollow fiber membrane characterized in that the wet porosity is 60 to 95%, preferably 76 to 95%, especially preferably 80 to 95%, and the sieving coefficient for albumin is not larger than 0.15, preferably not larger than 0.10, more preferably not larger than 0.05, and the average pore radius in the wet state is preferably 40 to 250 angstroms, more preferably 60 to 200 angstroms, most preferably 80 to 180 angstroms.

DESCRIPTION OF THE PREFERRED EMBODIMENTS

Figure 1:
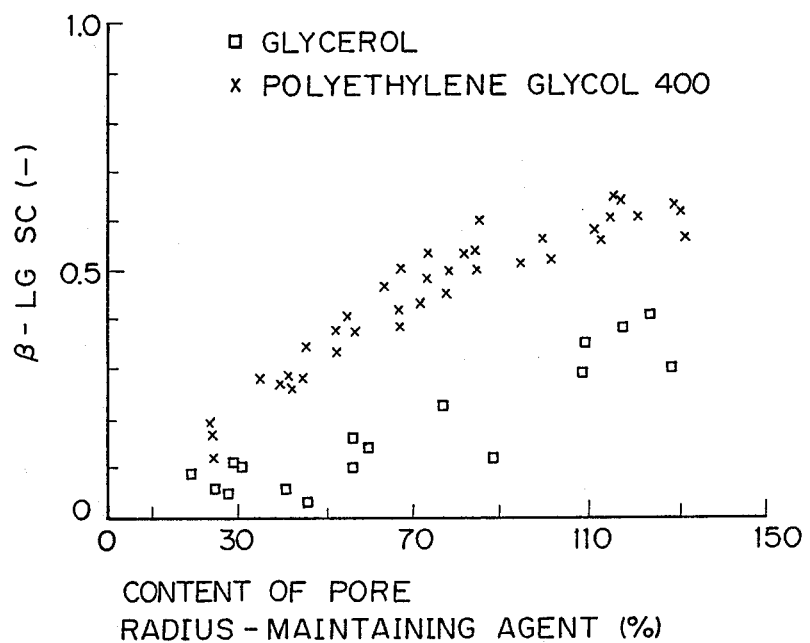
FIG. 1 shows the dependency of the sieving coefficient (SC) for $\beta$-lactoglobulin ($\beta$-LG) on the content of the pore radius-maintaining agent; and, FIG. 2 shows the dependency of the sieving coefficient (SC) for albumin (Alb) on the content of the pore radius-maintaining agent.

By the term "wet state" used herein is meant the state after the hollow fiber membrane has been immersed in pure water at 37° C. for at least one hour. The "average membrane pore radius" can be roughly calculated based on the micropore theory according to various equations described below by actually measuring and assuming the water filtration rate, diffusion rate, wet porosity and the like of the membrane. Note, the term "wet porosity" means the ratio of the volume occupied by water in the wet hollow fiber membrane. If the conditions for the preparation of the hollow fiber membrane are known, the following simple equation can be adopted for calculating the wet porosity. In this specification, all of the values of the wet porosity are those determined according to the following simple equation and are expressed in the unit of "%". If the preparation conditions are not known, the apparent volume is measured and the true density is measured by a pycnometer of the like, and these values can be used for the calculation.

$$Pm = D \cdot f(q) \cdot S_D \cdot \left[ \frac{Ak}{\tau \cdot \Delta X} \right] \quad (1)$$

$$Lp = \frac{r_p}{8\mu} \cdot \left[ \frac{Ak}{\tau \cdot \Delta X} \right] \quad (2)$$

wherein:

$$f(q) = (1 - 2.105q + 2.0865q^3 - 1.7068q^5 + \quad (3)$$
$$0.72603q^6)/(1 - 0.75857q^5)$$

$$S_D = (1 - q)^2 \quad (4)$$

$$q = r_s/r_p \quad (5)$$

$$\tau = \sqrt{H/(Ak/\tau)} \quad (6)$$

From the equations (1) and (2), the following equation can be derived:

$$\frac{P_m}{L_p} = D \cdot f(q) \cdot S_D/(r_p^2/(8\mu)) \quad (7)$$

In the above equations, $r_p$ stands for the average membrane pore radius (cm), $r_s$ stands for the molecular radius (cm) of water (assumed to be $1.07 \times 10^{-8}$), D stands for the diffusion coefficient (cm$^2$/sec) of water (assumed to be $2.97 \times 10^{-5}$), Ak stands for the aperture ratio (—) in the membrane surface, $\pi$ stands for the tortuosity factor (—) according to the pore theory (tortuos model), $\mu$ stands for the viscosity (Pa.sec) of water (assumed to be $0.691 \times 10^{-3}$), $L_p$ stands for the ultrafiltration rate of water (cm$^2$/cm$^2$/sec/Pa) through the membrane (actually measured at 37° C. under 200 mmHg with respect to a hollow fiber membrane module having an effective membrane area of 100 cm$^2$), Pm stands for the mass transfer coefficient (cm/sec) of water through the membrane (actually measured at 37° C.), H stands for the wet porosity (defined hereinafter), and $\Delta X$ stands for the thickness (cm) of the hollow fiber membrane in the wet state.

Namely, if Pm and Lp are actually measured, $r_p$ can be determined by equation (7).

Furthermore, other membrane structure parameters such as Ak and $\pi$ can be determined by determining H according to the following equation:

$$H = 1 - \frac{V_s \cdot \rho_s \cdot C/\rho_c}{\pi(r_o^2 - r_i^2) \omega \cdot Shr}$$

wherein H stands for the wet porosity (—), $V_s$ stands for the extrusion rate (cm$^2$/min) of the spinning solution, $\rho_s$ stands for the density (g/ml) of the spinning solution, C stands for the weight ratio (—) of cellulose in the spinning solution, $\omega$ stands for the winding speed (cm/min), $\rho_c$ stands for the true density (g/ml) of cellulose assumed to be 1.52), $r_o$ stands for the outer radius (cm) of the hollow fiber membrane in the wet state, $r_i$ stands for the inner radius (cm) of the hollow fiber membrane in the wet state, and Shr stands for the shrinkage (—) in the fiber length direction when the membrane is changed from the dry state to the wet state (actually measured at 37° C.).

Note, $V_s$, $\rho_s$, C and $\omega$ are actually measured when the follow fiber membrane is prepared, and $r_o$ and $r_i$ are actually measured by using a magnifying profile projector of 200 magnifications. Sr is determined by actually measuring the fiber length with respect to each of the dry hollow fiber membrane and wet hollow fiber membrane.

Since, in the hollow fiber membrane of the present invention, $\beta_2$-microglobulin can be removed by diffusion in an amount larger than the amount of $\beta_2$-microglobulin removed by the filtration removal mechanism, the hollow fiber membrane of the present invention can be advantageously applied to most general-purpose hemodialysis therapy.

Factors of the membrane participating in the diffusion removal are the membrane pore radius, the membrane thickness, the wet porosity of the membrane, and the like.

As the membrane material, regenerated cellulose which is characterized in that, since it has an excellent mechanical strength the dry membrane thickness can be greatly reduced in the preparation process, and since it has an excellent hydrophilic property a membrane having a very large wet porosity effective for the diffusion removal mechanism can be obtained while maintaining a practical strength. By using regenerated cellulose as the membrane material, a hollow fiber membrane having a higher capacity for removing low-molecular-weight substances and high-molecular-weight substances than general-purpose hemopurification membranes composed of other materials can be obtained, and this membrane is very suitable for use in an artificial kidney, especially a hemodialyser.

Clinically, preferably the reduction rate of $\beta_2$-microglobulin is at least 20%. In the case of a usual hemopurification module having a an effective membrane area of 1 to 3 m², this reduction rate can be obtained by using a membrane having a sieving coefficient of at least 0.3, preferably at least 0.5, to $\beta_2$-microglobulin or a mass transfer coefficient of at least $2 \times 10^{-5}$ cm/sec, or both of these properties.

The "reduction rate" can be calculated from the $\beta_2$-microglobulin concentrations in blood of a patient before and after dialysis while amending the condensation by a removal of water using the hematocrit.

The hollow fiber membrane of the present invention having the above-mentioned characteristics can be prepared, for example, according to the following process.

A cuprammonium cellulose spinning solution having a cellulose concentration of 4 to 12%, preferably 4 to 8%, which is prepared according to a known process, is extruded from a double orifice spinneret together with a known non-coagulating hollow portion-forming agent (for example, a liquid carbon halide such as Perclene, trichlene or trichlorotrifluoroethane, an ester such as isopropyl myristate, air or nitrogen, a Freon gas such as tetrafluoromethane or hexafluoroethane, or a Halon gas), or a hollow portion-forming agent having a slight coagulating property to the spinning dope, such as an aqueous solution of methanol, ethanol, propanol, methyl ethyl ketone, formic acid, acetic acid, propionic acid or a polyol such as glycerol, or a mixture of two or more thereof, and the extrudate is passed through a non-coagulating atmosphere and then introduced into a coagulating bath. As the coagulating agent, there can be used an aqueous solution of caustic soda, sulfuric acid, hydrochloric acid, acetic acid, ammonium sulfate, acetone or a lower alcohol, and sulfuric acid or an aqueous solution of ammonium sulfate is preferably used. Caustic soda has been generally used as the coagulating agent for the production of a cuprammonium cellulose hollow fiber membrane, but if sulfuric acid or an aqueous solution of ammonium sulfate is used, the hollow fiber membrane having a large membrane pore radius according to the present invention can be easily obtained. Moreover, if a coagulating agent of this type is used, the obtained membrane is not homogeneous, the effective membrane thickness advantageous for the diffusion removal of substances is small, and the wet porosity is increased in the obtained hollow fiber membrane. If the membrane pore radius of the velocity-controlling layer (the layer regulating the size of the permeating substance) is controlled in this hollow fiber membrane so that the average membrane pore radius is not larger than 250 angstroms, preferably not larger than 200 angstroms, a hollow fiber membrane is obtained which has a good capacity for the diffusion-filtration removal of high-molecular-weight uremic toxins having a molecular size smaller than that of albumin while controlling a loss of valuable components in blood having a molecular weight higher than that of albumin, in which the apparent molecular weight-fractionating characteristic, i.e., the molecular size selectivity, is greatly improved compared with that of the membrane of the filtration removal type.

The coagulated fiber-shaped product is scoured with water and an inorganic acid, a membrane pore radius-maintaining agent is applied to the scoured fiber-shaped product, and an intended hollow fiber membrane is obtained through the drying step. As the membrane pore radius-maintaining agent, there can be used, for example, glycerol, polyglycerol, liquid polyethylene glycol, aqueous sorbitol, or a mixture of two or more thereof. The term "liquid polyethylene glycol" referred to herein includes polyethylene glycol which is liquid at normal temperature and has an average molecular weight of 150 to 600, or a solution of polyethylene glycol having an average molecular weight of up to 20,000, inclusive of the above-mentioned polyethylene glycol, in water, an organic solvent such as acetone, ethanol, trichlene or toluene, or low-molecular-weight polyethylene glycol which is liquid at normal temperature.

The membrane pore radius can be determined according to the target uremic toxin to be removed among uremic toxins having a molecular weight smaller than that of albumin. Nevertheless, to obtain a hollow fiber membrane having an average membrane pore radius of 40 to 250 angstroms, preferably coagulation is effected with an aqueous solution of ammonium sulfate or sulfuric acid and a large quantity of glycerol, liquid polyethylene glycol or a mixture thereof is applied as the membrane pore radius-maintaining agent.

Glycerol has been practically used as the membrane pore radius-maintaining agent for a regenerated cellulose hollow fiber membrane, and glycerol is widely used for hollow fiber membranes of other materials. But, in conventional regenerated cellulose hollow fiber membranes, the content of the membrane pore radius-maintaining agent is lower than 10%. In contrast, in the hollow fiber membrane of the present invention, this content is 10 to 200%, preferably 20 to 160%, especially preferably 50 to 150%.

In a regenerated cellulose hollow fiber membrane containing such a large amount of glycerol, because of the physical properties of glycerol such as interfacial tension, hygroscopicity and viscosity, problems such as a sticky touch of the hollow fiber membrane, fixation of fibers when bundling of the hollow fiber membrane, difficult handling at the step of fabricating a hemopurification module or the like by bundling the hollow fiber membrane, insufficient potting of the fibers into a module because of an insufficient dispersibility of filaments, and an insufficient performance of the hollow fiber membrane as the module, easily occur. Furthermore, since glycerol gradually volatilizes at a temperature of at least 150° C., in the preparation process where the hollow fiber membrane is dried after an application of glycerol, a process problem arises in that it is difficult to control the glycerol content having a great influence on the performance of the hollow fiber membrane. To obviate these problems preferably liquid polyethylene glycol or a mixture of glycerol and liquid polyethylene glycol is used as the membrane pore radius-maintaining agent. If liquid polyethylene glycol is used instead of glycerol, the content of the membrane pore radius-maintaining agent necessary for attaining the same solute-removing performance can be reduced by 10 to 40% based on the weight of the material polymer. Moreover, because of differences of the physical properties, the abovementioned problems caused by the use of glycerol can be alleviated.

Figure 2:
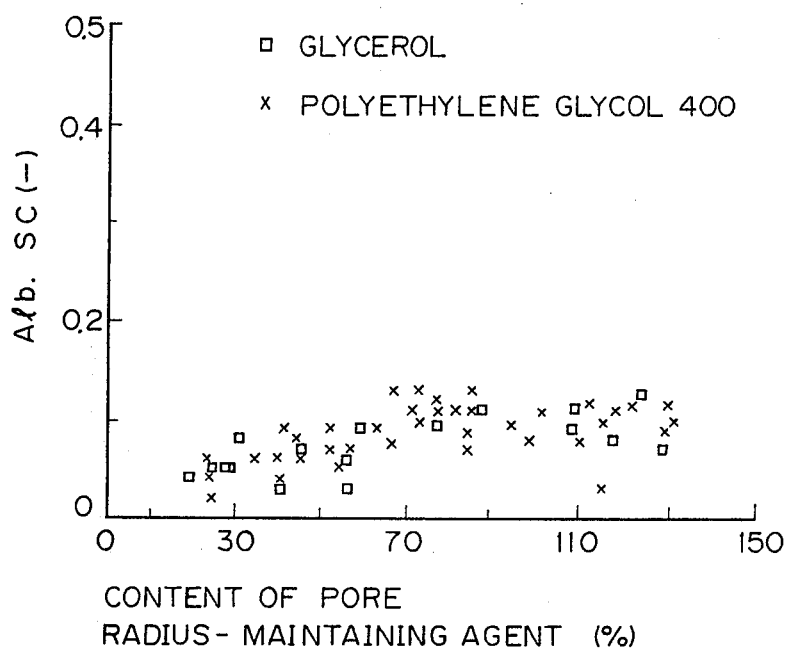

FIGS. 1 and 2 show the relationships of the contents of the membrane pore radius-maintaining agent to the performances of removing various solutes, which are observed when the application concentration and amount of the membrane pore radius-maintaining agent is changed under the same conditions as described in Example 7 given below with respect to a glycerol-containing hollow fiber (indicated by □) and a polyethylene glycol-containing hollow fiber (indicated by x).

It is seen that because of the differences of the molecular size and the mutual action to the hydroxyl group in the membrane pore radius-maintaining agent, the polyethylene glycol-containing hollow fiber is superior to the glycerol-containing hollow fiber from the viewpoint of the molecular weight-fractionating characteristic.

To maintain an intended structure in the completed hollow fiber membrane, a membrane pore radius-maintaining agent such as glycerol or liquid polyethylene glycol is used, and when the hollow fiber membrane is practically used as a separating membrane module, the membrane need not contain this membrane pore radius-maintaining agent. For example, where the hollow fiber membrane of the present invention is formed into a separating membrane of a hemopurification module and the module is used after the interior thereof is washed or a liquid is filled in the interior thereof, the membrane pore radius-maintaining is sometimes lost. Nevertheless, even in this case, the intended structure and performance of the hollow fiber membrane can be maintained unless the membrane is dried again, and therefore the object of the present invention still can be obtained.

The obtained hollow fiber membrane is practically used as a hemopurification module having an appropriate effective membrane area, for example, an artificial kidney. The larger this membrane area, the larger the amount of removed solute and the higher the ratio of the contribution to diffusion. This is be cause the contribution to diffusion is almost proportional to the membrane area and the contribution to filtration depends on the filtration volume and the area of the membrane through which this filtration volume permeates is not substantially significant. The significance of an increase of the membrane area with respect to the contribution to filtration resides in that, since an increase of the membrane area results in a reduction of the transmembrane pressure, which is necessary for obtaining a desired filtration rate, trapping of the membrane can be prevented.

The present invention will now be described in detail with reference to the following examples. Note, all of "%" in the examples are "% by weight", unless otherwise indicated.

EXAMPLE 1

A cuprammonium cellulose solution having a cellulose concentration of 8% and prepared according to the known process as a spinning solution and trichlorotrifluoroethane as a hollow portion-forming agent were extruded at rates of 5.8 ml/min and 3.0 ml/min, respectively, from a double orifice spinneret into air, and the extrudate was allowed to naturally drop along a length of about 25 cm and coagulated with a 20% aqueous solution of ammonium sulfate maintained at 25° C. The coagulated fiber shaped product was guided onto a conveyor of the scouring step and shower-scoured with warm water at 50° C., 2% aqueous sulfuric acid at 50° C. and warm water at 50° C. in the recited order on the conveyor whereat a forced mechanical tension was not imposed on the fiber shaped product. The fiber-shaped product was picked up and glycerol was applied by a membrane pore radius-maintaining agent feeder, the fiber was travelled through a tunnel-type drier maintained at 155° C., and wound up on a spool at a speed of 80 m/min. Thus, a hollow fiber membrane having a glycerol content of 130% based on the cellulose was obtained.

The membrane structural characteristics and in vitro membrane filtration performance of this hollow fiber membrane are shown in Table 1. It is clear that not only $\beta_2$-microglobulin but also $\beta$-lactoglobulin, which is a membrane permeation performance-indicating substance ($\beta$-LG, molecular weight=35000(dimer)), can be removed at a high efficiency and the permeation of albumin is very small, and that a permeation of substances having a molecular size larger than that of albumin is rejected but a variety of substances having a molecular size smaller than that of albumin can be removed. The results obtained when this hollow fiber membrane was clinically used in the form of hemopurification module having effective membrane areas of 1.0 m$^2$ and 1.5 m$^2$, respectively, were as shown in Table 2. Clinical data include individual variations in patients and differences of the dialysis conditions (such as the amount of water removed) among patients, and the characteristics of the hollow fiber membrane are not precisely reflected, but it is clear that 190 to 360 mg of $\beta_2$-microglobulin can be removed by one treatment and the membrane is practically very valuable.

The difference of the amount of actually removed $\beta_2$-microglobulin brought about by changing the membrane area is much larger than the difference of the removed amount estimated from the experimental fact that, in the group of patients treated with 1.0 m$^2$ of the membrane, the $\beta_2$-microglobulin concentration in blood before the treatment and the total amount of water removed during the treatment were 46.3 mg and 1.8 l and in the group of patients treated with 1.5 m$^2$ of the membrane, they were 48.2 mg and 2.2 l. The amount of the solute removed based on the filtration mechanism can be estimated according to the calculation equation of (solute concentration x amount of removed water x sieving coefficient). Properly speaking, the sieving coefficient, one characteristic value of the membrane, is not changed in the same membrane even if the membrane area is changed. The above fact indicates that the removal of $\beta_2$-microglobulin based on the diffusion mechanism is more effectively accomplished by an increase of the membrane area. The reason why the $\beta_2$-microglobulin concentration is not substantially changed according to the membrane area, even though a large quantity of $\beta_2$-microglobulin is removed, is that as $\beta_2$-microglobulin is removed from blood, $\beta_2$-microglobulin present in other body fluid is transferred into blood. This phenomenon has no influence on the judgement of the utility of the membrane of this example for achieving the object of removing larger quantities of $\beta_2$-microglobulin and the like according to the present invention.

EXAMPLE 2

A hollow fiber membrane having a glycerol content of 120% based on the cellulose was prepared in the same manner as described in Example 1 except that the extrusion rate of the spinning solution was adjusted to 4.55 ml/min, the extrusion rate of the hollow portion-forming agent was adjusted to 2.78 ml/min, the natural falling length was adjusted to about 15 cm and the drying temperature was adjusted to 155° C.

The characteristics of the obtained hollow fiber membrane were as shown in Table 1. The membrane has an effective capacity for removing substances having a molecular size smaller than that of albumin.

EXAMPLE 3

A hollow fiber membrane was prepared in the same manner as described in Example 1 except that the extrusion rate of the spinning solution, the extrusion rate of the hollow portion-forming agent, the natural falling length, and the drying temperature were changed to 12.0 ml/min, 2.40 ml/min, about 30 cm, and 145° C., respectively.

The characteristics of the obtained hollow fiber membrane were as shown in Table 1, and the membrane has an effective capacity for removing substances having a molecular size smaller than that of albumin.

EXAMPLE 4

A hollow fiber membrane having a glycerol content of 50% based on the cellulose was prepared in the same manner as described in Example 1 except that the extrusion rate of the spinning solution was changed to 10.3 ml/min, tetra-fluoromethane (gaseous at normal temperature under atmospheric pressure) was used as a hollow portion-forming agent and extruded at a rate of 3.3 ml/min, the drying temperature was adjusted to 50° C., and the winding speed was changed to 90 m/min.

The characteristics of the obtained hollow fiber membrane were as shown in Table 1, and the membrane had an effective capacity for removing substances having a molecular size smaller that of albumin.

EXAMPLE 5

A cuprammonium cellulose solution having a cellulose concentration of 6% and prepared according to the known process as a spinning solution and tetrafluoromethane (gaseous at normal temperature under atmospheric pressure) as a hollow portion-forming agent were extruded at rates of 6.17 ml/min and 2.45 ml/min, respectively, from a double orifice spinneret, and the extrudate was allowed to naturally fall along a length of about 40 cm and coagulated with an 11% aqueous caustic soda maintained at 25° C. The fiber-shaped product was passed through, in succession, warm water maintained at 45° C., 2% aqueous sulfuric acid maintained at 40° C., and warm water maintained at 45° C. according to the known stretch scouring process, and then wound at a speed of 90 m/min. The hollow fiber in the wound state was immersed in a 30% aqueous solution of glycerol for 30 minutes. Then, the hollow fiber was passed through a tunnel type drier maintained at 145° C. at inlet and outlet speed of 60 m/min while the hollow fiber was being unwound, whereby a dry hollow fiber membrane having a glycerol content of 160% based on the cellulose was obtained.

The structural characteristics and in vitro permeation performances of the obtained hollow fiber membrane were as shown in Table 1.

EXAMPLE 6

A cuprammonium cellulose solution having a cellulose concentration of 8% and prepared according to the known process as a spinning solution and trichlorotrifluoroethane as a hollow portion-forming agent were extruded at rates of 5.8 ml/min and 2.44 ml/min, respectively, from a double orifice spinneret into air, and the extrudate was allowed to naturally drop along a length of about 25 cm, and coagulated with a 20% aqueous solution of ammonium sulfate maintained at 25° C. The coagulated fiber-shaped product was guided onto a conveyor of the scouring step and shower-scoured with, in succession, warm water at 50° C., 2% aqueous sulfuric acid at 50° C. and warm water at 50° C. on the conveyor whereat a forced mechanical tension was not imposed on the fiber-shaped product. The fiber-shaped product was picked up and 100% polyethylene glycol 400 (Macrogol 400 listed in Japanese Pharmacopeia; average molecular weight=about 400) was applied by a membrane pore radius-maintaining agent feeder, the fiber was travelled through a tunnel-type drier maintained at 155° C., and wound at a speed of 90 m/min. Thus, a hollow fiber membrane having a polyethylene glycol 400 content of 105% based on the cellulose was obtained.

One hundred sets of artificial kidney modules having a membrane area of about 1.5 m² were assembled by using the obtained hollow fiber membrane and a urethane type potting agent. In all of these 100 modules, a problem such as insufficient potting did not arise.

The structural characteristics and in vitro permeation performances of the hollow fiber membrane were as shown in Table 1.

EXAMPLE 7

A hollow fiber membrane having a polyethylene glycol 400 content of 24% based on the cellulose was prepared in the same manner as described in Example 6 except that the extrusion rate of the spinning solution was changed to 6.17 ml/min, a 30% aqueous solution of polyethylene glycol 400 was fed to obtain the desired content, the drying temperature was changed to 155° C., and the winding speed was changed to 100 m/min.

One hundred artificial kidney modules having a membrane area of about 1.5 m² were assembled by using the obtained hollow fiber membrane and a urethane type potting agent.

In 99 of these 100 modules, a problem such as insufficient potting did not arise.

The characteristics of the obtained hollow fiber membrane were as shown in Table 1, and the membrane had an effective capacity for removing substances having a molecular size smaller than that of albumin.

EXAMPLE 8

A hollow fiber membrane having a polyethylene glycol 400 content of 131% based on the cellulose was prepared in the same manner as described in Example 7 except that polyethylene glycol 400 was applied in the form of a 70% aqueous solution.

One hundred artificial modules having a membrane area of about 1.5 m² were assembled by using the obtained hollow fiber membrane and a urethane type potting agent. In all of these 100 modules, a problem such as insufficient potting did not arise.

The characteristics of the hollow fiber membrane were as shown in Table 1, and the hollow fiber membrane had an effective capacity for removing substances having a molecular size smaller than that of albumin.

EXAMPLE 9

A hollow fiber membrane having a polyethylene glycol content of 150% based on the cellulose was prepared in the same manner as described in Example 6 except that the extrusion rate of the spinning solution was changed to 13.0 ml/min, the extrusion rate of the hollow portion-forming agent was changed to 2.78 ml/min, 100% polyethylene glycol 400 was used, the drying temperature was adjusted to 150° C., and the winding speed was adjusted to 100 m/min.

The characteristics of the obtained hollow fiber membrane were as shown in Table 1.

EXAMPLE 10

A hollow fiber membrane having a polyethylene glycol 200 content of 120% based on the cellulose was prepared in the same manner as described in Example 6 except that the extrusion rate of the spinning solution was changed to 5.8 ml/min, the hollow portion-forming agent extrusion rate was changed to 2.83 ml/min, 100% polyethylene glycol 200 (average molecular weight=about 200) was used as the membrane pore radius-maintaining agent, the drying temperature was adjusted to 160° C., and the winding speed was changed to 90 m/min.

One hundred artificial kidney modules having a membrane area of about 1.5 m² were assembled by using the obtained hollow fiber membrane and a urethane type potting agent. In all of these 100 modules, a problem such as insufficient potting did not arise.

The characteristics of the hollow fiber membrane were as shown in Table 1.

EXAMPLE 11

A hollow fiber membrane having a polyethylene glycol 600 content of 165% based on the cellulose was prepared in the same manner as described in Example 6 except that the extrusion rate of the spinning solution was adjusted to 5.8 ml/min, the extrusion rate of the hollow portion-forming agent was adjusted to 2.80 ml/min, 50% polyethylene glycol 600 (average molecular weight=about 600) was used as the membrane pore radius-maintaining agent, the drying temperature was adjusted to 155° C., and the winding speed was adjusted to 90 m/min.

The characteristics of the obtained hollow fiber membrane were as shown in Table 1.

EXAMPLE 12

A hollow fiber membrane having a polyethylene glycol 600 content of 108% based on the cellulose was prepared in the same manner as described in Example 11 except that the amount fed of 50% aqueous polyethylene glycol 600 was adjusted so as the obtain the intended content.

The characteristics of the obtained hollow fiber membrane were as shown in Table 1.

EXAMPLE 13

A hollow fiber membrane having a polyethylene glycol 1540 content of 111% based on the cellulose was prepared in the same manner as described in Example 11 except that 50% aqueous polyethylene glycol 1540 (average molecular weight=about 1540) was used as the membrane pore radius-maintaining agent in an amount adjusted so as to obtain the intended content.)

The characteristics of the used membrane pore radius-maintaining agent, which was a waxy solid at normal temperature under atmospheric pressure, were reflected on the obtained hollow fiber membrane, and the membrane had very good feel and handling property and no fixation was observed among dry hollow fibers.

The characteristics of the hollow fiber membrane were as good as shown in Table 1.

EXAMPLE 14

A hollow fiber membrane in which the total membrane pore radius-maintaining agent content was 110% based on the cellulose was prepared in the same manner as described in Example 11 except that a mixture of 30 parts of an 85% aqueous solution of glycerol and 70 parts of 100% polyethylene glycol 400 was used as the membrane pore radius-maintaining agent.

Since the glycerol content was reduced in this hollow fiber membrane, the handling property was better than in the hollow fiber membrane containing glycerol alone in the same membrane pore radius-maintaining agent content.

The characteristics of the obtained hollow fiber membrane were as shown in Table 1.

EXAMPLE 15

A hollow fiber membrane was prepared in the same manner as described in Example 8 except that a 70% aqueous solution of glycerol was used instead of the 70% aqueous solution of polyethylene glycol 400 used in Example 8. The glycerol content of the obtained hollow fiber membrane was 110%, and when this hollow fiber membrane was compared with the membrane of Example 8, it was seen that glycerol was more highly volatilizable than polyethylene glycol 400. One hundred artificial kidney modules having a membrane area of about 1.5 m² were assembled under the same conditions as described in Examples 6, 7, 8 and 10 by using the obtained hollow fiber membrane and a urethane type potting agent. The number of the modules wherein a problem such as insufficient potting did not arise was as small as 43.

The characteristics of the obtained hollow fiber membrane were as shown in Table 1.

COMPARATIVE EXAMPLE 1

A cuprammonium cellulose hollow fiber membrane of the type practically used for an artificial kidney was prepared according to the known process. As shown in Table 1, the hollow fiber membrane had an excellent capacity for removing low-molecular-weight substances such as urea but an insufficient capacity for removing high-molecular-weight substances such as $\beta_2$-microglobulin. Accordingly, the hollow fiber membrane was not suitable for achieving the object of the present invention.

COMPARATIVE EXAMPLE 2

A cuprammonium cellulose hollow fiber membrane having an inner diameter of 250 μm, a membrane thickness of 25 μm, and an average membrane pore radius of 300 angstroms was prepared according to the process for the preparation of a cellulose large-pore-radius membrane, disclosed in Japanese Unexamined Patent Publication No. 59-204912. As shown in Table 1, the hollow fiber membrane had a sieving coefficient of 1.0 for $\beta_2$-microglobulin and a very high removal capacity, but the sieving coefficient for albumin, which is a valuable blood protein in blood, was 1.00 (complete leak) and the membrane was not suitable for achieving the object of the present invention, i.e., a prevention of the loss of valuable proteins.

TABLE 1

Membrane Structure and in vitro Membrane Performances

| | Membrane Structure Characteristics | | | | in vitro Membrane Performances | | | | | | | | | | Membrane Pore Radius-Maintaining Agent | |
|---|---|---|---|---|---|---|---|---|---|---|---|---|---|---|---|---|
| | Inner diameter of dry hollow fiber (μm) | Thickness of dry hollow fiber (μm) | Average membrane pore radius (Å) | Wet porosity (%) | Mass transfer coefficient (× 10⁻⁴ cm/S) | | | | | Ultrafiltration rate (ml/m²/hr/mmHg) Calf serum solution | Sieving coefficient | | | | Kind | Content based on cellulose (%) |
| | | | | | Aqueous solution | | Calf serum solution | | | | Aqueous solution | | Calf serum solution | | | |
| | | | | | Urea | Vitamin B₁₂ | β₂-MG | Albumin | | | β-LG | | β₂-MG | Albumin | | |
| Example 1 | 200 | 25 | 110 | 90 | 9.0 | 1.44 | 0.60 | 0.00 | | 8.2 | 0.70 | | 0.50 | 0.080 | glycerol | 130 |
| Example 2 | 180 | 18 | 145 | 85 | 12.1 | 1.80 | 0.65 | 0.00 | | 11.0 | 0.62 | | 0.67 | 0.080 | glycerol | 120 |
| Example 3 | 180 | 32 | 160 | 92 | 10.7 | 1.50 | 0.52 | 0.00 | | 11.3 | 0.70 | | 0.70 | 0.050 | glycerol | 140 |
| Example 4 | 200 | 14 | 70 | 85 | 10.0 | 1.10 | 0.50 | 0.00 | | 7.5 | 0.60 | | 0.41 | 0.001 | glycerol | 50 |
| Example 5 | 220 | 44 | 120 | 85 | 10.0 | 1.20 | 0.35 | 0.00 | | 13.5 | 0.46 | | 0.45 | 0.050 | glycerol | 160 |
| Example 6 | 190 | 16 | 120 | 85 | 11.4 | 1.56 | 0.61 | 0.00 | | 8.7 | 0.67 | | 0.84 | 0.020 | PEG400 | 105 |
| Example 7 | 185 | 11 | 45 | 73 | 10.5 | 1.00 | 0.20 | 0.00 | | 7.0 | 0.23 | | 0.35 | 0.000 | PEG400 | 24 |
| Example 8 | 185 | 19 | 115 | 83 | 11.0 | 1.50 | 0.55 | 0.00 | | 8.3 | 0.62 | | 0.70 | 0.030 | PEG400 | 131 |
| Example 9 | 185 | 30 | 165 | 91 | 12.5 | 1.85 | 0.65 | 0.00 | | 14.5 | 0.65 | | 0.70 | 0.020 | PEG400 | 150 |
| Example 10 | 200 | 20 | 120 | 86 | 11.0 | 1.62 | 0.57 | 0.00 | | 8.5 | 0.73 | | 0.81 | 0.020 | PEG200 | 120 |
| Example 11 | 180 | 19 | 85 | 86 | 11.5 | 1.52 | 0.35 | 0.00 | | 15.7 | 0.68 | | 0.74 | 0.001 | PEG600 | 165 |
| Example 12 | 190 | 14 | 80 | 85 | 11.0 | 1.37 | 0.30 | 0.00 | | 13.7 | 0.66 | | 0.76 | 0.000 | PEG600 | 108 |
| Example 13 | 180 | 13 | 70 | 82 | 10.8 | 1.60 | 0.25 | 0.00 | | 13.0 | 0.64 | | 0.70 | 0.000 | PEG1540 | 111 |
| Example 14 | 190 | 16 | 80 | 83 | 10.9 | 1.48 | 0.30 | 0.00 | | 13.0 | 0.59 | | 0.81 | 0.000 | 3 parts of 85% glycerol and 7 parts of PEG400 | 110 |
| Example 15 | 185 | 18 | 90 | 77 | 10.0 | 1.35 | 0.46 | 0.00 | | 8.0 | 0.45 | | 0.58 | 0.100 | glycerol | 110 |
| Comparative Example 1 | 200 | 14 | 30 | 65 | 9.5 | 0.85 | 0.10 | 0.00 | | 4.0 | 0.10 | | 0.04 | 0.100 | glycerol | 5 |
| Comparative Example 2 | 250 | 30 | 300 | 83 | 9.5 | 1.35 | 0.40 | 0.01 | | 13.0 | 1.00 | | 1.00 | 1.00 | not added | — |

β₂-MG = β₂-microglobulin; β-LG = β-lactoglobulin; PEG = polyethylene glycol

TABLE 2

Clinical Results of Membrane of Example 1

| Membrane Area of Dialyzer | Patient[*1] | Ultrafiltration rate[*2] (ml/hr/mmHg) | Sieving coefficient[*2] $\beta_2$-MG | Sieving coefficient[*2] Alb. | $\beta_2$-MG concentration in blood (mg/l) Before dialysis | $\beta_2$-MG concentration in blood (mg/l) After dialysis | Reduction rate of $\beta_2$-MG concentration (%) | Amount of removed $\beta_2$-MG (mg) | Total amount of removed water (l) |
|---|---|---|---|---|---|---|---|---|---|
| 1.0 m² | A | 13.0 | 0.75 | 0.08 | 39.0 | 29.0 | 26.7 | 176 | 1.9 |
| | B | 10.5 | 0.66 | 0.07 | 63.0 | 48.0 | 24.7 | 173 | 1.8 |
| | C | 9.7 | 0.86 | 0.09 | 45.0 | 36.2 | 21.2 | 113 | 0.4 |
| | D | 8.8 | 0.61 | 0.04 | 32.0 | 25.0 | 21.6 | 108 | 1.7 |
| | E | 11.6 | 0.87 | 0.09 | 37.0 | 23.0 | 40.9 | 96 | 2.2 |
| | F | 7.2 | 0.54 | 0.05 | 62.0 | 45.0 | 33.5 | 305 | 2.5 |
| 1.5 m² | A | 12.0 | 0.78 | 0.13 | 38.9 | 27.5 | 30.1 | 271 | 1.9 |
| | B | 14.4 | 0.49 | 0.10 | 48.8 | 38.0 | 21.5 | 191 | 1.4 |
| | G | 11.9 | 0.73 | 0.07 | 46.6 | 41.1 | 15.7 | 255 | 4.1 |
| | H | 13.7 | 0.80 | 0.13 | 66.9 | 47.8 | 37.1 | 319 | 1.4 |
| | I | 14.2 | 0.72 | 0.12 | 51.8 | 32.6 | 40.7 | 420 | 1.2 |
| | J | 10.5 | 0.74 | 0.07 | 35.9 | 31.6 | 19.6 | 362 | 3.3 |

[*1] same alphabet indicates same patient.
[*2] calculated from filtration rate by ECUM (Extracorporeal ultrafiltration method) and solute concentration in filtrate; filtration rate expressed per dialyzer.

The methods of determining the characteristics of the membranes will now be described in brief.

in vitro Measurements

A hollow fiber membrane was assembled in a small-size separating module having an effective length of about 16 cm and a membrane area of about 100 cm² (about 30 cm² in the case of a substance the permeability of which was difficult to detect), and the module was used for the following measurements.

(Ultrafiltration Rate)

Calf serum maintained at 37° C. was passed at a linear velocity of 100 cm/min through the small-size separating module and an ultrafiltration load of 50 mmHg was applied. The volume of filtrate through the hollow fiber membrane per unit time was measured, and the ultrafiltration rate was calculated according to the customary procedures.

(Mass Transfer Coefficient)

Urea and vitamin $B_{12}$ were used in the form of aqueous solutions for the measurement, and $\beta_2$-microglobulin was used in the form of a calf serum solution heated at 37° C. In connection with albumin, one contained in calf serum was measured. The exterior of the hollow fiber membrane assembled into the small-size separating module was filled with a phosphate buffered saline solution to form a closed space, and the sample liquid was circulated and passed at a linear velocity of 100 cm/min within the hollow fiber membrane.

Before initiation of the circulation of the sample solution and after the lapse of a predetermined time, the solute concentrations in the sample solution and the phosphate buffered saline solution were measured, and the mass transfer coefficient was calculated according to customary procedures.

(Sieving Coefficient)

$\beta$-Lactoglobulin ($\beta$-LG) was used in the form of an aqueous solution for the measurement and $\beta_2$-microglobulin ($\beta_2$-MG) was used in the form of a calf serum solution heated at 37° C. In connection with albumin, one contained in calf serum was measured. The operation was carried out in the same manner as described above with respect to the measurement of the ultrafiltration rate. In the case of $\beta$-LG, the transmembrane pressure was adjusted to 200 mmHg. The solute concentrations in the original sample solution and the ultrafiltrate were measured and the sieving coefficient was calculated as the ratio between the two solute concentrations.

(Membrane Pore Radius-Maintaining Agent Content)

About 2 g of the obtained hollow fiber membrane was precisely weighed and cut, and the membrane pore radius-maintaining agent contained in the cut membrane was extracted with 100 ml of pure water. The concentration of the membrane pore radius-maintaining agent in the extract was detected according to the refractive index method. The concentration was converted to the absolute value and the content (weight ratio) based on the cellulose was calculated.

ex vivo (Clinical) Measurements

(Ultrafiltration Rate)

When water was removed at a speed of 1 l/hr according to the customary ECUM (Extracorporeal ultrafiltration method), the transmembrane pressure was determined from the pressures on the artery side, vein side and dialyzate side of the hemopurification module, and the ultrafiltration rate was calculated from the transmembrane pressure.

(Sieving Coefficient)

At the measurement of the ultrafiltration rate, blood was collected simultaneously at both the artery side and vein side of the hemopurification module, and furthermore, the ultrafiltrate was collected. The average solute concentration in blood and the solute concentration in the ultrafiltrate were measured, and the sieving coefficient was calculated from these solute concentrations.

(Amount of Removed $\beta_2$-MG)

At the hemopurification, all of the dialyzate was recovered, and the amount of removed $\beta_2$-MG was calculated from the concentration of $\beta_2$-MG contained in the recovered dialyzate.

(Total Amount of Removed Water)

The total amount of water removed was determined from the body weights of the patient before and after the hemopurification.

Note, the concentrations of the solutes were determined according to the following methods.

$\beta$-LG: UV absorbance measurement $\beta$-MG: RIA (Radio Immuno Assay) method Urea: urease-indophenol method Vitamin $B_{12}$ visible ray absorbance measurement Albumin: BCG (Bromocresol Green) method (RIA method in the low concentration range)

The hollow fiber membrane of the present invention, which is characterized in that the wet porosity is 60 to 95%, preferably 76 to 95%, more preferably 80 to 95%, the average membrane pore radius in the wet state is preferably 40 to 250 angstroms, the mass transfer coefficient for $\beta_2$-microglobulin in water at 37° C. is preferably at least $2\times10^{-5}$ cm/sec, and the sieving coefficient for albumin at a hemofiltration of blood is not larger than 0.15, is suitable for the filtration, especially the diffusion removal, of $\beta_2$-microglobulin, and has an excellent removal capacity for high-molecular-weight uremic toxins other than $\beta_2$-microglobulin. Furthermore, in the hemopurification therapy, especially the hemodialysis therapy, a loss of valuable substances such as albumin can be controlled to a level that can be practically ignored.

Namely, according to the present invention, there is provided a hemopurification membrane, especially a hemodialysis membrane, which is capable of removing uremic toxins having a molecular weight lower than that of albumin, including high-molecular-weight substances represented by $\beta_2$-microglobulin, without a substantial loss of valuable components having a molecular weight higher than that of albumin.

Moreover, if polyethylene glycol is used as the membrane pore radius-maintaining agent, the abovementioned functional effects can be attained at a low content of the membrane pore radius-maintaining agent, and the apparent molecular weight-fractionating characteristic can be further improved. Moreover, when the hollow fiber membrane is bundled, sticking among fibers is controlled and the dispersibility of fibers is not degraded, and therefore, problems such as insufficient potting of fibers into a module and insufficient manifestation of performances of the hollow fiber membrane as the module can be overcome.

We claim:

1. A regenerated cellulose hollow fiber membrane comprising a hollow portion continuously penetrating in the direction of the fiber axis, having properties of a wet porosity of 60 to 95%, and an albumin sieving coefficient not larger than 0.15 at hemofiltration, said properties being sufficient for providing properties for the diffusion removal of substances ranging from low molecular weight substances to high-molecular weight substances.

2. A regenerated cellulose hollow fiber membrane according to claim 1, wherein the wet porosity is 76 to 95%.

3. A regenerated cellulose hollow fiber membrane according to claim 1, wherein the wet porosity is 80 to 95%.

4. A regenerated cellulose hollow fiber membrane according to any of claims 1 through 3, wherein the average pore radius of the membrane in the wet state is 40 to 250 angstroms.

5. A regenerated cellulose hollow fiber membrane according to any of claims 1 through 4, wherein the mass transfer coefficient for $\beta_2$-microglobulin is at least $2\times10^{-5}$ cm/sec.

6. A regenerated cellulose hollow fiber membrane according to any of claims 1 through 5, which contains polyethylene glycol and has an albumin sieving coefficient not larger than 0.10.

* * * * *